No. 727,172. Patented May 5, 1903.

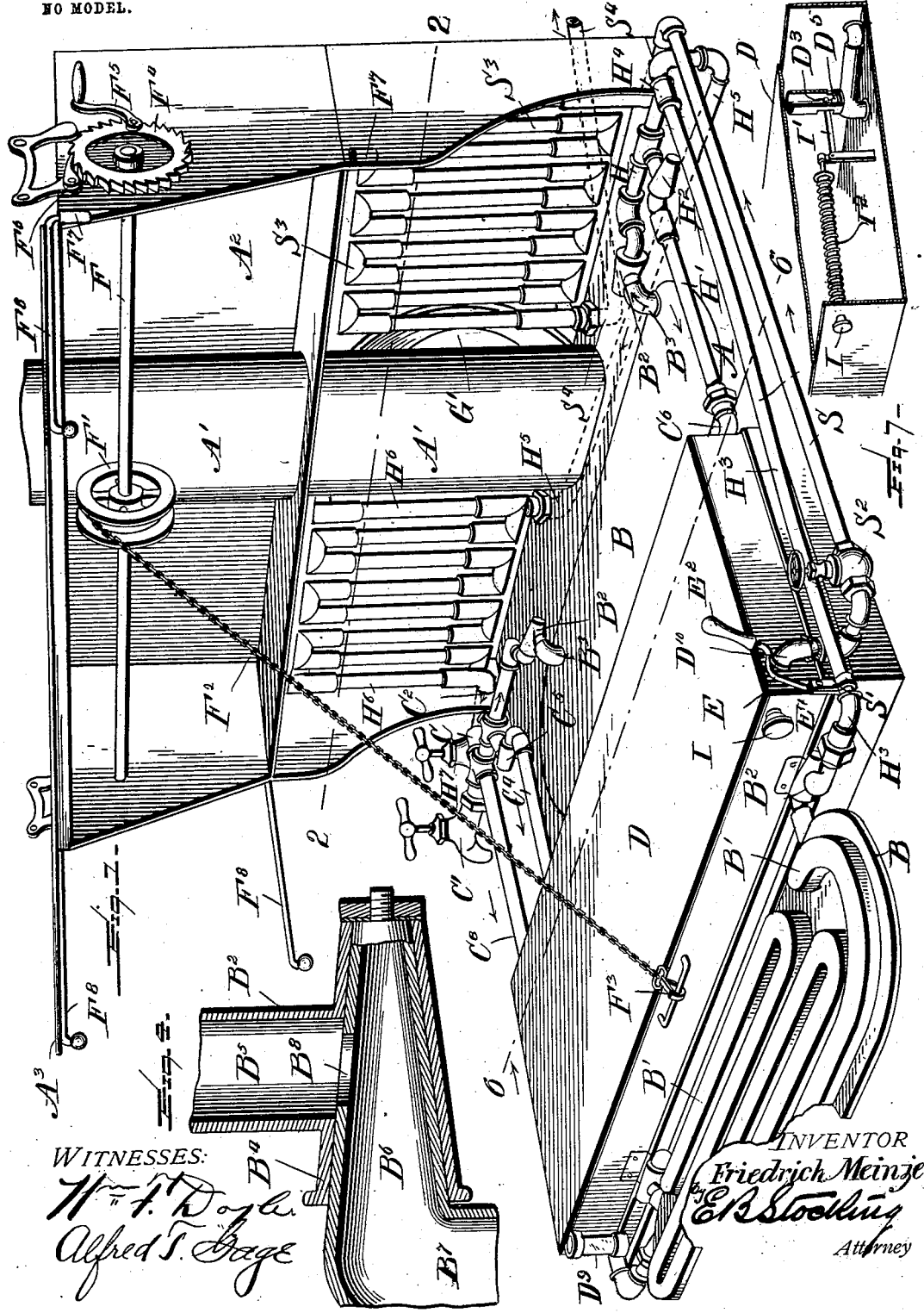

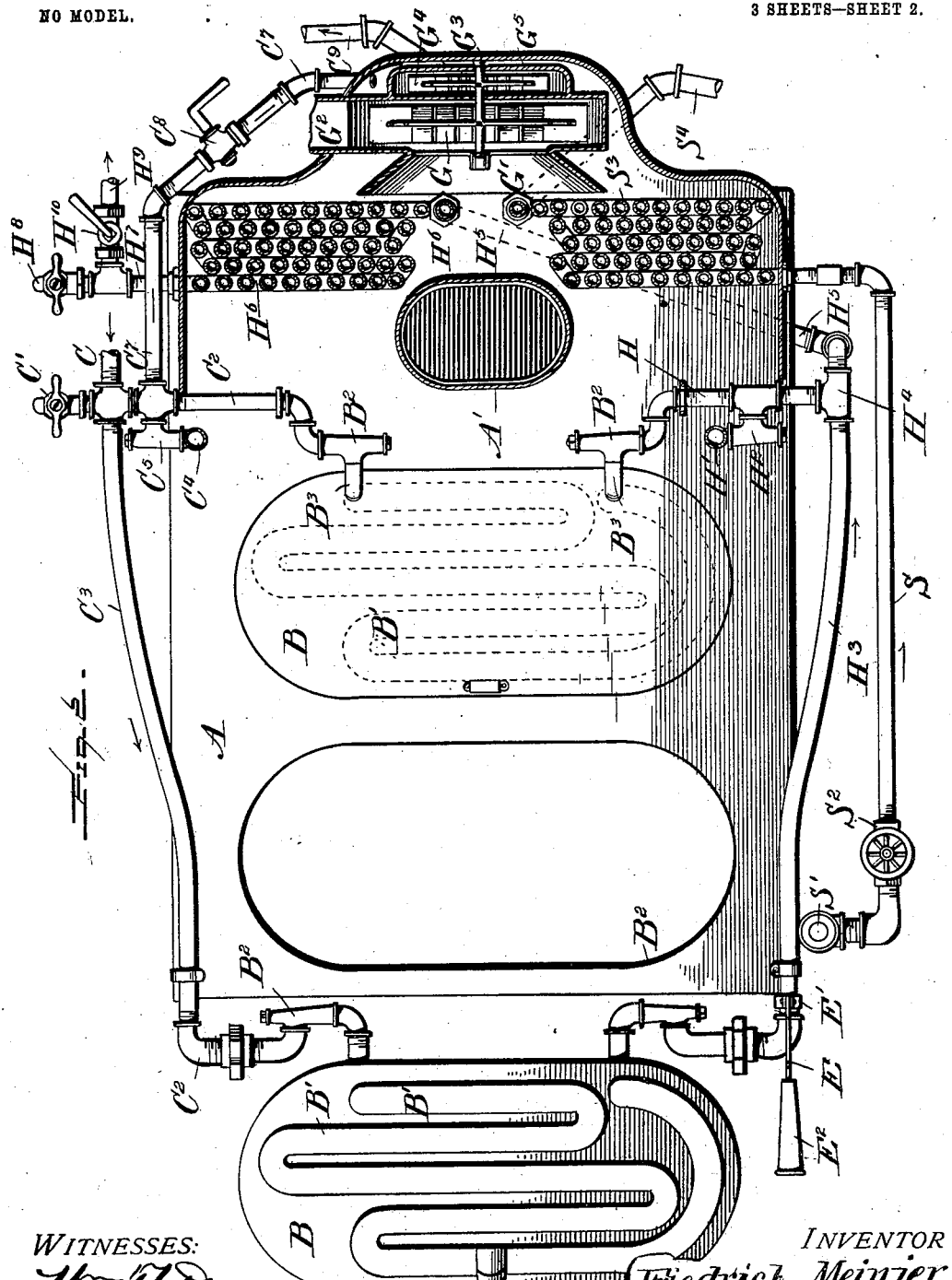

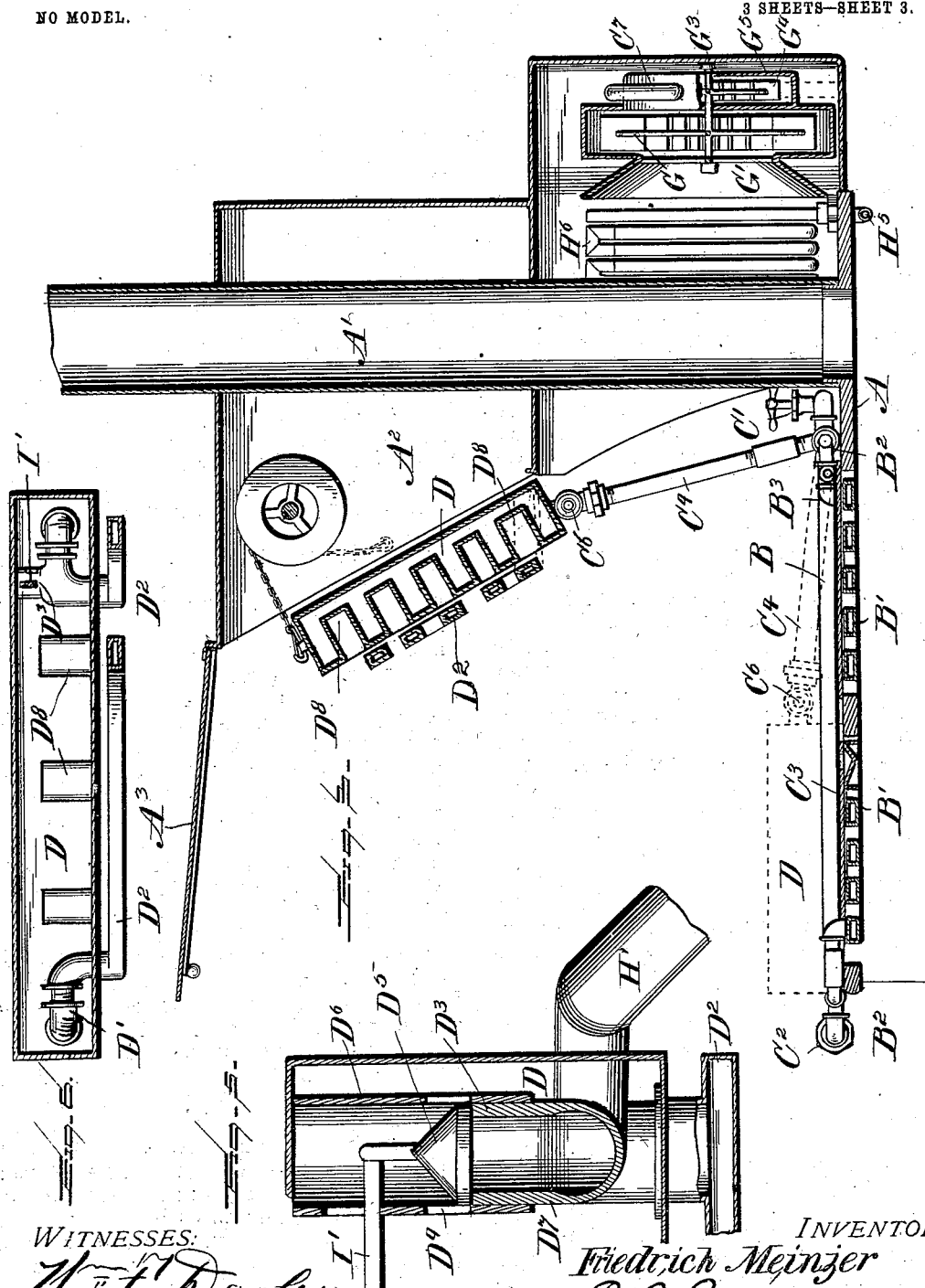

UNITED STATES PATENT OFFICE.

FRIEDRICH MEINZER, OF CLEVELAND, OHIO.

HEATING APPARATUS.

SPECIFICATION forming part of Letters Patent No. 727,172, dated May 5, 1903.

Application filed October 14, 1902. Serial No. 127,310. (No model.)

*To all whom it may concern:*

Be it known that I, FRIEDRICH MEINZER, a citizen of the United States, residing at Cleveland, in the county of Cuyahoga, State of Ohio, have invented certain new and useful Improvements in Heating Apparatus, of which the following is a specification, reference being had therein to the accompanying drawings.

This invention relates to a heating apparatus, and particularly to a construction adapted to heat air and water and also produce steam for such purposes as may be desired.

The invention has for an object to provide a construction of water-heating and steam-producing means adapted for application to the top of an ordinary stove, range, or other form of cooking apparatus, which can be easily swung out of its operative position above the fire-box or burner, and when thus swung the circulation of water therein is cut off by means of the rotary or swinging valve forming the hinge-joint for the heating apparatus.

A further object of the invention is to produce a steam-pan in which heated water may be introduced and steam generated, said pan being mounted so as to oscillate upon a swinging valve and to be removed from the top of the stove when not in use.

Another object of the invention is to provide a means for heating air and conveying the same to any point desired, the motor for such purpose being propelled by a water-current.

Other and further objects and advantages of the invention will be hereinafter set forth and the novel features thereof defined by the appended claims.

In the drawings, Figure 1 is a perspective of the invention applied to a range-top; Fig. 2, a horizontal section on the line 2 2 of Fig. 1 with the steam-pan raised; Fig. 3, a central vertical section; Fig. 4, a sectional detail of the swinging valve; Fig. 5, a similar view of the check-valve within the steam-pan; Fig. 6, a longitudinal section through the steam-pan on the line 6 6 of Fig. 1, and Fig. 7 is a detail perspective of the feed-valve for the steam-pan.

Like letters of reference refer to like parts in the several figures of the drawings.

This invention is adapted to be applied to any form of heating or cooking apparatus and is here shown in connection with the top A of a range, which is provided with a smoke-pipe A' at the rear and the usual warming-closet $A^2$ adjacent to the said pipe and provided with the swinging door $A^3$. When the present invention is used, the ordinary lids are removed, so as to permit the reception within the stove top of the plate B, which carries the water-heating coil B' upon its under face, one of said plates being shown open in Figs. 1 and 2. These plates are pivotally mounted at the front and rear, respectively, of the top by means of the swinging valves $B^2$, which are connected to pipe-sections $B^3$, communicating with the opposite ends of the coil B', carried by the plate. The rotary or swinging valves may be of any preferred construction, but are here shown as comprising the sleeve-section $B^4$, carried at the end of a pipe $B^5$, and the plug $B^6$, fitted therein and communicating with a pipe $B^7$, said plug being provided with an opening $B^8$, adapted to communicate with the pipe $B^5$ when the parts are in the position shown in Fig. 4, but at other times to cut off the passage or circulation of any liquid through the valve.

For the purpose of establishing water connections with these water-heaters a circuit of pipes is provided, as will be hereinafter described, although I do not intend to confine my invention specifically thereto, as other arrangements may be used to accomplish the same results. I have, however, shown a form particularly adapted to the construction herein presented, which comprises a pipe C, intended to be connected with a main or other source of water-supply under pressure and provided with the coupling having upon one branch a faucet C' from which cold water may be drawn, while from another branch a pipe $C^2$ extends inward to supply water through the swinging valve $B^2$ to the rear heating-coil carried by the plate B, while another branch $C^3$ extends to the front of the top and there communicates with the swinging valve $B^2$ for supplying water to the coil B' of the front heater. Another branch pipe $C^4$ is extended from the cold-water inlet to the steam-pan D and there communicates with a pipe D', Fig. 6, leading to a heating-coil $D^2$, carried by the under surface of the steam-pan, which coil at its opposite ends extends upward into the steam-pan and is provided with a feed-valve $D^3$, as shown by detail in Fig. 7. This valve is provided with outlet-openings $D^4$ adjacent to a valve-disk $D^5$, which reciprocates within a casing $D^6$ and rests upon the upper end of the pipe-section $D^7$, so as to admit the heated water by operating the push-rod I into the steam-pan D, yet prevent the return of such water through any of the connecting-pipes. This valve $D^3$ also communicates with a hot-water pipe $H'$, extending from the conducting-pipe H, which communicates with the outlet from the heating-coil carried by the inner water-heater, so that the heated water therefrom is discharged into the steam-pan in connection with that from the heating-coil D, carried by the pan. This pipe $H'$ is provided with a swinging valve $H^2$ at its inner end, by means of which in connection with a similar valve $C^5$ at the opposite end the pan may be swung into a substantially vertical position, as shown by full lines in Fig. 3. Similar swinging valves $C^6$ are provided at the point of connection between the pipes $H'$ and $C^4$ to permit the movement of the pan relative to the pipes. The lower surface of the pan D may be provided with recessed portions $D^8$, extending inward for the purpose of providing increased radiating-surface for the generation of steam from the hot water contained within the pan, and a suitable water-gage $D^9$ is provided upon the pan, as shown in Fig. 1. At one end of the pan a steam-outlet $D^{10}$ is provided, which is adapted to removably connect with a coupling $S'$, carried by the steam-pipe S, which is provided with a valve $S^2$ adjacent to said coupling. This connection may be made in any manner—for instance, by means of the pipe $D^{10}$, extending into the coupling $S'$ and held in contact therewith by means of a lever E, pivotally mounted at $E'$ upon a relatively fixed part and provided with a handle $E^2$, which when depressed causes the lever to contact with the pipe $D^{10}$ and hold the same in engagement with the coupling $S'$. The steam-pipe S extends to the rear of the stove and is there connected with a radiating-coil $S^3$, the outlet $S^4$ from which may extend to any desired point where the steam or exhaust therefrom may be used.

For the purpose of raising the steam-pan D when it is not desired to use the same a shaft F is provided above the stove-top and has secured thereon a winding-drum $F'$, from which a chain or flexible connection $F^2$ extends to the steam-pan, where it may be removably connected, as shown at $F^3$, while the end of this shaft F is provided with a ratchet-wheel $F^4$ and handle $F^5$, secured upon the face of the wheel for rotating the same, while the wheel may be held in any desired position by means of the pawl $F^6$, as shown in Fig. 1. Adjacent to this shaft sockets $F^7$ are provided upon the side walls of the warming-closet and adapted to receive rods $F^8$, which are pivotally mounted therein and adapted to swing under the cover $A^3$ when opened or to form supports for drying any articles which may be hung thereon.

The outer heating-coil $B'$ is provided at its discharge end with a hot-water pipe $H^3$, extending toward the rear of the stove and there connected by a coupling $H^4$ with the pipe H from the inner coil $B'$. The hot water is carried thence through the pipe $H^5$ to the radiating-coil $H^6$ at the rear of the stove and discharged therefrom by the pipe $H^7$, which is provided with a draw-off cock $H^8$ and with a connection $H^9$, which may extend to a stand boiler or reservoir and is provided with a turn-cock $H^{10}$.

At the rear of the smoke-pipe $A'$ and radiating-coils $H^6$ and $S^3$ a fan G is located and provided with an entrance-funnel $G'$ to receive the heated air from the coils and pipe and convey the same by means of the pipe $G^2$ to any desired point for heating an adjacent room or other purpose. This fan may be operated in any desired manner, but is here shown as provided upon its shaft $G^3$ with a water-wheel $G^4$, located within a closed casing $G^5$ and provided with a cold-water connecting-pipe $C^7$, having a turn-plug $C^8$ therein and extending through the casing, so as to rotate the water-wheel by impact therewith, while the discharge from the casing may be carried to any suitable point by means of the pipe $C^9$, extending from the lower portion thereof. The steam-pan may be provided with any suitable form of feed-valve—for instance, as in Fig. 7, a crank-arm $I'$ may be connected to the valve disk and rod, while the latter is surrounded by a spring $I^2$ to normally close the valve.

From the foregoing description the construction and general operation of the parts will be understood, and it is only desired to note that the inlets for the cold water extend at one side of the stove to each of the heating-coils therefor, while at the opposite side the discharge-pipes for the hot water and steam extend. The cold water is thus brought into contact with a coil directly over the fire and quickly heated, so that it can be at once used, while if the steam-pan be raised into its vertical position there would be no circulation therethrough, and the top of the stove is left perfectly free for cooking in the ordinary manner. When the steam-pan is lowered, the water is heated by the coils $B'$ and $D^2$ before entering the pan, so that steam is quickly generated therein and passes through the steam-pipe and radiating-coil to any suitable point of discharge or use, and this coil, in connection with the hot-water coil at the opposite side of the stove, thoroughly heats the air, which is drawn by the fan and forced to the room to be heated, while if the invention be used in a large kitchen the steam-discharge can be carried to steam-pans, while the hot-water discharge may be carried to a suitable stand-boiler for washing purposes. It will therefore be seen that this invention provides means for securing hot air and hot water without interfering with the use of the stove-top for ordinary cooking purposes, while when the steam-pan is lowered it may be used for a similar purpose and would prevent the burning of articles which could not ordinarily be safely cooked upon the directly-heated stove-top.

While the several devices herein shown are operatively connected with each other and coöperate in their results, still it will be apparent that they may be independently used when desired and that changes may be made in the details of construction and configuration thereof without departing from the spirit of the invention as defined by the appended claims.

Having described my invention and set forth its merits, what I claim, and desire to secure by Letters Patent, is—

1. In a heating apparatus, a cold-water pipe, a stove-top plate, a coil supported upon its under face, a rotary valve connecting said coil and pipe to form a pivot for said top plate, a hot-water pipe, and a rotary valve connecting said hot-water pipe and coil to form a pivot for said top plate; substantially as specified.

2. In a heating apparatus, a cold-water pipe, a stove-top provided with a coil upon its under face, a rotary valve connecting said coil and pipe, a hot-water pipe, a rotary valve connecting said hot-water pipe and coil, a steam-pan, a pipe connection between said pan and hot-water pipe, and a steam-discharge pipe extending from said pan; substantially as specified.

3. In a heating apparatus, a cold-water pipe, a stove-top provided with a coil upon its under face, a rotary valve connecting said coil and pipe, a hot-water pipe, a rotary valve connecting said hot-water pipe and coil, a steam-pan, a pipe connection between said pan and hot-water pipe, a steam-discharge pipe extending from said pan, a radiating-coil connected to said steam-discharge pipe, and a radiating-coil connected to said hot-water pipe; substantially as specified.

4. In a heating apparatus, a cold-water pipe, a stove-top provided with a coil upon its under face, a rotary valve connecting said coil and pipe, a hot-water pipe, a rotary valve connecting said hot-water pipe and coil, a steam-pan, a pipe connection between said pan and hot-water pipe, a steam-discharge pipe extending from said pan, a radiating-coil connected to said steam-discharge pipe, a radiating-coil connected to said hot-water pipe, a fan-casing located adjacent to said radiating-pipes, and a fan disposed therein; substantially as specified.

5. In a heating apparatus, a cold-water pipe, a stove-top provided with a coil upon its under face, a rotary valve connecting said coil and pipe, a hot-water pipe, a rotary valve connecting said hot-water pipe and coil, a steam-pan, a pipe connection between said pan and hot-water pipe, a steam-discharge pipe extending from said pan, a radiating-coil connected to said steam-discharge pipe, a radiating-coil connected to said hot-water pipe, a fan-casing located adjacent to said radiating-pipes, a fan disposed therein, a water-motor connected to drive said fan, a pipe connection with the cold-water pipe for operating said motor, and a discharge-pipe from said motor; substantially as specified.

6. In a heating apparatus, a cold-water pipe, a stove-top provided with a coil upon its under face, a rotary valve connecting said coil and pipe, a hot-water pipe, a rotary valve connecting said hot-water pipe and coil, a steam-pan, a pipe connection between said pan and hot-water pipe, a steam-discharge pipe extending from said pan, a radiating-coil connected to said steam-discharge pipe, a radiating-coil connected to said hot-water pipe, a fan-casing located adjacent to said radiating-pipes, a fan disposed therein, a water-motor connected to drive said fan, a pipe connection with the cold-water pipe for operating said motor, a discharge-pipe from said motor, a rotary-valve connection between the hot-water pipe and the pipe leading to said steam-pan, a separable coupling between the discharge from the steam-pan and said steam-pipe, and means for raising and retaining said steam-pan in a substantially vertical position; substantially as specified.

7. In a heating apparatus, a cold-water pipe, a stove-top provided with a coil upon its under face, a rotary valve connecting said coil and pipe, a hot-water pipe, a rotary valve connecting said hot-water pipe and coil, a steam-pan, a pipe connection between said pan and hot-water pipe, a steam-discharge pipe extending from said pan, a radiating-coil connected to said steam-discharge pipe, a radiating-coil connected to said water-pipe, a fan-casing located adjacent to said radiating-pipes, a fan disposed therein, a water-motor connected to drive said fan, a pipe connection with the cold-water pipe for operating said motor, a discharge-pipe from said motor, a rotary-valve connection between the hot-water pipe and the pipe leading to said steam-pan, a separable coupling between the discharge from the steam-pan and said steam-pipe, means for raising and retaining said steam-pan in a substantially vertical position, a water-heating coil upon the under surface of said steam-pan, a cold-water connection extending to said coil, and a feed-valve at the discharge end of said coil within said steam-pan; substantially as specified.

8. In a heating apparatus, a water-heating coil, inlet and discharge pipes thereto, a valve connection for said pipes, a steam-pan communicating with said discharge-pipe, and a valved outlet for discharging heated water into said pan from the discharge-pipe; substantially as specified.

9. In a heating apparatus, a stove-top, lids therefor pivoted at the front and rear respectively of the stove, coils carried by the under surface of said lids, cold-water-supply pipes extending at one side of the top to one end of said coils, and hot-water-discharge pipes extending at the opposite side of the top from the opposite ends of the coils; substantially as specified.

10. In a heating apparatus, a stove-top, lids therefor pivoted at the front and rear respectively of the stove, coils carried by the under surface of said lids, cold-water-supply pipes extending to one end of said coils, hot-water-discharge pipes extending from the opposite ends thereof, a hot-air flue, a radiating-coil adjacent thereto and communicating with the hot-water discharge, and a conducting-pipe extending from said coil; substantially as specified.

11. In a heating apparatus, a steam-pan, a pipe extending therefrom and communicating with a hot-water supply, a valved connection with said supply, a steam-discharge pipe, and a separable connection from said pan with said discharge-pipe; substantially as specified.

12. In a heating apparatus, a steam-pan, a pipe extending therefrom and communicating with a hot-water supply, a valved connection with said supply, a steam-discharge pipe, a separable connection from said pan with said discharge-pipe, and a pivoted lever adapted to engage and lock said connection; substantially as specified.

13. In a heating apparatus, a steam-pan, a pipe extending therefrom and communicating with a hot-water supply, a valved connection with said supply, a steam-discharge pipe, a separable connection from said pan with said discharge-pipe, a pivoted lever adapted to engage and lock said connection, a shaft supported above said pan at the rear of the stove, a winding-drum carried by said shaft, and a flexible connection extended therefrom to said pan; substantially as specified.

14. In a heating apparatus, a steam-pan, a pipe extending therefrom and communicating with a hot-water supply, a valved connection with said supply, a steam-discharge pipe, a separable connection from said pan with said discharge-pipe, a pivoted lever adapted to engage and lock said connection, a shaft supported above said pan at the rear of the stove, a winding-drum carried by said shaft, a flexible connection extended therefrom to said pan, a ratchet-wheel carried by said shaft, and a pawl to engage and hold said wheel; substantially as specified.

15. In a heating apparatus, a steam-pan, a pipe extending therefrom and communicating with a hot-water supply, a valved connection with said supply, a steam-discharge pipe, a separable connection from said pan with said discharge-pipe, a pivoted lever adapted to engage and lock said connection, a shaft supported above said pan at the rear of the stove, a winding-drum carried by said shaft, a flexible connection extended therefrom to said pan, a ratchet-wheel carried by said shaft, a pawl to engage and hold said wheel, a pivoted cover to inclose said shaft and drum, and a pivotally-mounted rod adapted to extend beneath said cover; substantially as specified.

16. In a heating apparatus, a steam-pan, a pipe extending therefrom and communicating with a hot-water supply, a valved connection with said supply, a steam-discharge pipe, a separable connection from said pan with said discharge-pipe, a pivoted lever adapted to engage and lock said connection, a shaft supported above said pan at the rear of the stove, a winding-drum carried by said shaft, a flexible connection extended therefrom to said pan, a ratchet-wheel carried by said shaft, a pawl to engage and hold said wheel, a pivoted cover to inclose said shaft and drum, a pivotally-mounted rod adapted to extend beneath said cover, a water-heating coil carried by the bottom of said steam-pan, a discharge from said coil controlled by a feed-valve, and a connection from said hot-water pipe communicating with the discharge from said coil; substantially as specified.

In testimony whereof I affix my signature in presence of two witnesses.

FRIEDRICH MEINZER.

Witnesses:
CHARLES GOLDSMITH,
ISIDOR GOLDSMITH.